United States Patent
Sievers-Engler

(10) Patent No.: US 11,408,865 B2
(45) Date of Patent: Aug. 9, 2022

(54) SAMPLE INJECTOR

(71) Applicant: Roche Diagnostics Operations, Inc., Indianapolis, IN (US)

(72) Inventor: Adrian Sievers-Engler, Muensingen (DE)

(73) Assignee: Roche Diagnostics Operations, Inc., Indianapolis, IN (US)

(*) Notice: Subject to any disclaimer, the term of this patent is extended or adjusted under 35 U.S.C. 154(b) by 517 days.

(21) Appl. No.: 16/543,000

(22) Filed: Aug. 16, 2019

(65) Prior Publication Data
US 2020/0064314 A1 Feb. 27, 2020

(30) Foreign Application Priority Data

Aug. 27, 2018 (EP) .................... 18190878

(51) Int. Cl.
*G01N 30/22* (2006.01)
*G01N 30/72* (2006.01)
*G01N 30/20* (2006.01)

(52) U.S. Cl.
CPC ......... *G01N 30/22* (2013.01); *G01N 30/7233* (2013.01); *G01N 2030/201* (2013.01)

(58) Field of Classification Search
None
See application file for complete search history.

(56) References Cited

U.S. PATENT DOCUMENTS

| | | |
|---|---|---|
| 6,382,035 B1 | 5/2002 | Nichols |
| 8,196,456 B2 | 6/2012 | Hochgraeber et al. |
| 8,677,808 B2 * | 3/2014 | Ozbal .................... G01N 30/24 210/656 |
| 10,473,631 B2 * | 11/2019 | Wachinger ............ G01N 30/24 |

FOREIGN PATENT DOCUMENTS

| | | |
|---|---|---|
| EP | 1536228 A1 | 6/2005 |
| JP | S6-250659 A | 3/1987 |
| JP | 2012-088133 A | 5/2012 |
| WO | 2004/025272 A1 | 3/2004 |
| WO | 2008/005845 A2 | 1/2008 |
| WO | 2009/111228 A2 | 9/2009 |
| WO | 2010/038853 A1 | 4/2010 |
| WO | 2011/052445 A1 | 5/2011 |
| WO | 2012/058632 A1 | 5/2012 |
| WO | 2014/085003 A2 | 6/2014 |
| WO | 2017/103180 A1 | 6/2017 |

* cited by examiner

*Primary Examiner* — Daniel S Larkin
(74) *Attorney, Agent, or Firm* — Roche Diagnostics Operations, Inc.

(57) ABSTRACT

A sample injector is disclosed comprising a switching valve comprising an input port, an aspiration/dispensing port, a loop input port and a loop output port, a pump port and a column port, an aspiration pump connected to the aspiration/dispensing port via a buffer loop for aspirating a sample into the buffer loop when the aspiration/dispensing port is connected to the loop input port, a sample loop connected to the switching valve between the loop input port and the loop output port, for receiving the sample aspirated into the buffer loop when the loop input port is connected to the aspiration/dispensing port, a column connected to the column port, and a pump connected to the pump port, for injecting the sample received into the sample loop into the column when the pump port is connected to the loop output port and the column port is connected to the loop input port.

15 Claims, 11 Drawing Sheets

SAMPLE INJECTOR

CROSS-REFERENCE TO RELATED APPLICATIONS

This application is a continuation of EP 18190878.1, filed Aug. 27, 2018, which is hereby incorporated by reference.

BACKGROUND

The present disclosure generally relates to a sample injector and to a method of injecting a sample for liquid chromatography, to a liquid chromatography system and to a clinical diagnostics system.

Typically, for carrying out a liquid chromatography (LC) sample injection, a sample is loaded into a sample loop that is a tubing having a predefined inner volume with two ends connected to respective ports of a multi-port high-pressure LC switching valve before being pumped by a high-pressure LC pump from the sample loop to a LC column, both the LC pump and the LC column being fluidically connected to other ports of the same valve. The sample can be either drawn or pushed from a sample line into the sample loop by a dedicated pump, typically a syringe pump, also connected to the same valve generating negative and/or positive pressure.

For high-throughput applications requiring many consecutive sample injection cycles, and especially for random-access analysis of different samples possibly requiring different injection conditions, e.g., different sample volumes, different flow rates, different pressures, speed of sample loading and flexibility in adapting the conditions for each sample in a scheduled sequence, are important. In the attempt of increasing flexibility, e.g., for allowing online dilution, modified sample injectors using two high-pressure LC switching valves, two sample loops, additional valves and multiple pumps have also been proposed. Such a solution is however even slower than standard solutions. Moreover, the complex fluidic construction including various fluidic lines and connections make the washing process inefficient, increases the risk of carryover between different samples and also increases the dead volume, therefore requiring the use of larger total sample volumes.

Therefore, there is a need for a sample injector for liquid chromatography that is suitable for high-throughput and random-access liquid chromatography in order to enable short injection cycle times, fast sample loading while maintaining precision, flexibility in adapting the injection conditions, e.g. adapting the volume of analytical sample being injected while minimizing sample carryover and internal fluidic volumes, thus requiring lower total sample amounts and allowing compatibility with micro-LC (μLC) and/or small-bore LC by requiring only one high-pressure LC switching valve, thus remaining simple, easy to control and to maintain, compact and cost-effective.

SUMMARY

According to the present disclosure, a sample injector for liquid chromatography (LC) is presented. The sample injector can comprise an LC switching valve comprising a sample input port, an aspiration/dispensing pump port, an analytical sample loop input port and an analytical sample loop output port, and an LC pump port and an LC column port; an aspiration pump fluidically connected to the aspiration/dispensing pump port via a buffer sample loop for aspirating a sample into the buffer sample loop when the aspiration/dispensing pump port is connected to the sample input port; an analytical sample loop connected to the LC switching valve between the analytical sample loop input port and the analytical sample loop output port for receiving at least part of the sample aspirated into the buffer sample loop when the analytical sample loop input port is connected to the aspiration/dispensing pump port; an LC column fluidically connected to the LC column port; and an LC pump fluidically connected to the LC pump port for injecting the sample received into the analytical sample loop into the LC column when the LC pump port is fluidically connected to the analytical sample loop output port and the LC column port is fluidically connected to the analytical sample loop input port.

Accordingly, it is a feature of the embodiments of the present disclosure to provide a sample injector for liquid chromatography that is suitable for high-throughput and random-access liquid chromatography in order to enable short injection cycle times, fast sample loading while maintaining precision, flexibility in adapting the injection conditions, e.g. adapting the volume of analytical sample being injected while minimizing sample carryover and internal fluidic volumes, thus requiring lower total sample amounts and allowing compatibility with micro-LC (μLC) and/or small-bore LC by requiring only one high-pressure LC switching valve, thus remaining simple, easy to control and to maintain, compact and cost-effective. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1A:
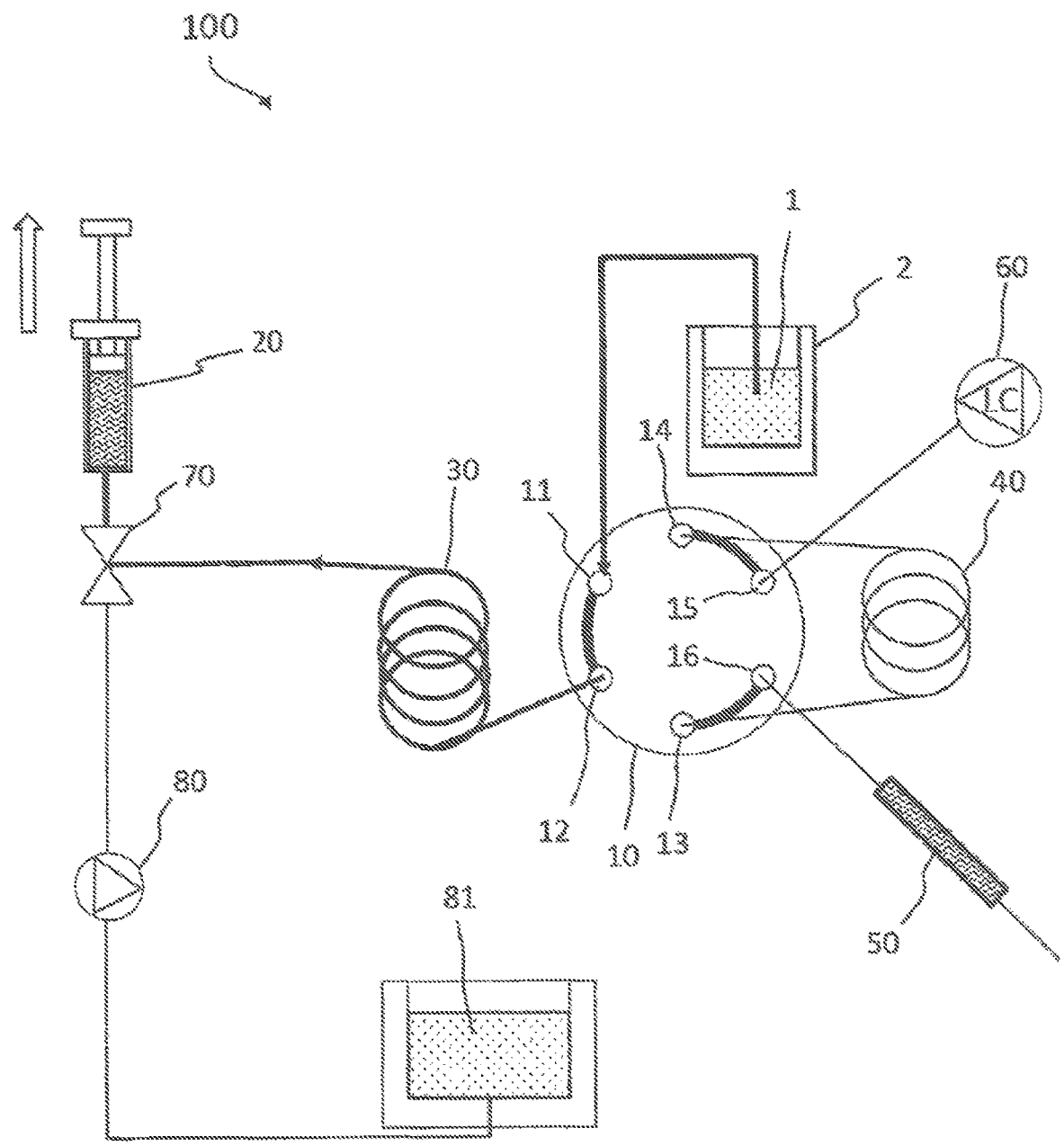
FIG. 1A illustrates schematically a first embodiment of sample injector and a step of a respective method of injecting a sample for liquid chromatography according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

The sample injector of the present disclosure can comprise a liquid chromatography (LC) switching valve comprising a sample input port, an aspiration/dispensing pump port, an analytical sample loop input port and an analytical sample loop output port, and an LC pump port and an LC column port. The sample injector can further comprise an aspiration pump fluidically connected to the aspiration/dispensing pump port via a buffer sample loop for aspirating a sample into the buffer sample loop when the aspiration/dispensing pump port is connected to the sample input port; an analytical sample loop connected to the LC switching valve between the analytical sample loop input port and the analytical sample loop output port, for receiving at least part of the sample aspirated into the buffer sample loop when the analytical sample loop input port is connected to the aspiration/dispensing pump port; an LC column fluidically connected to the LC column port, and an LC pump fluidically connected to the LC pump port, for injecting the sample received into the analytical sample loop into the LC column when the LC pump port is fluidically connected to the analytical sample loop output port and the LC column port is fluidically connected to the analytical sample loop input port.

The term "sample" can refer to a biological material suspected of containing one or more analytes of interest and whose detection, qualitative and/or quantitative, may be associated to a clinical condition. The sample can be derived from any biological source, such as a physiological fluid, including, blood, saliva, ocular lens fluid, cerebral spinal fluid, sweat, urine, milk, ascites fluid, mucous, synovial fluid, peritoneal fluid, amniotic fluid, tissue, cells or the like. The sample can be pretreated prior to use, such as preparing plasma or serum from blood, diluting viscous fluids, lysis or the like; methods of treatment can involve filtration, centrifugation, distillation, concentration, inactivation of interfering components, and the addition of reagents. A sample may be used directly as obtained from the source in some cases or following a pretreatment and/or sample preparation workflow to modify the character of the sample, e.g., after adding an internal standard, after being diluted with another solution or after having being mixed with reagents e.g., to enable carrying out one or more in vitro diagnostic tests, or for enriching (extracting/separating/concentrating) analytes of interest and/or for removing matrix components potentially interfering with the detection of the analyte(s) of interest. Examples of analytes of interest can be vitamin D, drugs of abuse, therapeutic drugs, hormones, and metabolites in general. The list is however not exhaustive.

"Liquid chromatography (LC)" can be an analytical process that can subject samples injected by a sample injector to chromatographic separation though a LC column in order, for example, to separate analytes of interest from matrix components, e.g., remaining matrix components after sample preparation that may still interfere with a subsequent detection, e.g., a mass spectrometry detection and/or in order to separate analytes of interest from each other in order to enable their individual detection. "High-performance liquid chromatography (HPLC)" or "ultra-high-performance liquid chromatography (UHPLC)" or "micro liquid chromatography (µLC)" or "small-bore liquid chromatography (small-bore LC)" forms of liquid chromatography performed under pressure.

An "LC column" may refer to any of a column, a cartridge, a capillary and the like for performing separations of a chromatographic nature. Columns are typically packed or loaded with a stationary phase, through which a mobile phase is pumped in order to trap and/or separate and elute and/or transfer analytes of interest under selected conditions, e.g., according to their polarity or log P value, size or affinity, as generally known. This stationary phase can be particulate or beadlike or a porous monolith. However, the term "column" may also refer to capillaries which are not packed or loaded with a stationary phase but rely on the surface area of the inner capillary wall to effect separations. The LC column may be exchangeable and/or operate in parallel or in sequence to one or more other LC columns. An LC column may be, for example, a rapid trap and elute online LC column, a high-performance LC (HPLC) column or an ultra-high-performance LC (UHPLC) column, and may be of any size, including micro-LC columns and small-bore LC columns with an inner diameter of less than about 1 mm.

The term "valve" can refer to a flow-regulating device to control, redirect, restrict or stop flow. An "LC switching valve" can be a multi-port valve that can control flow between elements connected to the ports. This is typically achieved by moving one or more valve conduits to switch communication between different elements. Elements may be fluidically connected to the ports via further conduits, like pipes, tubes, capillaries, microfluidic channels and the like and by fittings like screws/nuts and ferrules, or alternative liquid-tight sealings e.g., maintained in place by a clamp mechanism. An LC switching valve can normally be capable of allowing liquid pressures in the order of magnitude used for HPLC or higher.

The LC switching valve of the present disclosure can comprise a sample input port, an aspiration/dispensing pump port, an analytical sample loop input port and an analytical sample loop output port, and an LC pump port and an LC column port.

According to an embodiment, the LC switching valve can have inner valve conduit(s) with an inner diameter of less than 0.6 mm such as, for example, between about 0.5 mm and about 0.2 mm or such as, for example, about 0.4 mm or about 0.25 mm.

According to an embodiment, the LC switching valve can have a switching time of about 500 ms or less.

A "sample input port" can be a valve port through which a sample can enter the valve from a sample container such as, for example, via a needle placed in fluidic connection with the sample input port. According to an embodiment, the sample input port can also be a waste port for wasting waste liquid from the sample injector into a waste container, possibly through the same sample needle.

An "aspiration/dispensing pump port" can be a valve port through which a sample entered via the sample input port, at least temporarily leaves the valve before re-entering the valve. In one embodiment, an aspiration pump can be fluidically connected to the aspiration/dispensing pump port via a buffer sample loop for aspirating a sample into the buffer sample loop when the aspiration/dispensing pump port is connected to the sample input port.

The "analytical sample loop input port" and "the analytical sample loop output port" can be valve ports to which two respective ends of an analytical sample loop can be connected for receiving at least part of the sample aspirated into the buffer sample loop when the analytical sample loop input port is connected to the aspiration/dispensing pump port.

An "LC column port" can be a valve port to which an LC column can be fluidically connected.

An "LC pump port" can be a valve port to which an LC pump can be fluidically connected for injecting the sample received into the analytical sample loop into the LC column when the LC pump port can be fluidically connected to the analytical sample loop output port and the LC column port can be fluidically connected to the analytical sample loop input port.

According to an embodiment, the analytical sample loop output port can be connected to the sample input port when the analytical sample loop input port is connected to the aspiration/dispensing pump port.

An "LC pump" can be a pump that may vary in pressure capacity but that can yield a consistent and reproducible volumetric flow rate. Pressure in HPLC may typically reach as high as 60 MPa or about 600 atmospheres, whereas UHPLC and μ-LC systems have been developed to work at even higher pressures, e.g., up to 120 MPa or about 1200 atmospheres and, therefore, can be able to use much smaller particle sizes in the LC columns (<2 μm). LC pumps may be also configured as binary pumps, in the case of conditions requiring the use of elution gradients.

According to one embodiment, the sample injector can comprise at least one binary LC pump, e.g., one or two high-pressure gradient pumps.

According to one embodiment, the LC pump can yield a pressure of 60 MPa to 90 MPa such as, for example, 75 MPa to 85 MPa or such as, for example, 80 MPa.

According to one embodiment, the LC pump can be configured to operate with a flow rate between 1 μl/min and 300 μl/min or more, and typically can operate at flow rates between 100 μl/min to 250 μl/min and an accuracy of, for example, about ±5% or less.

An "aspiration pump" according to the present disclosure can be a pump that is typically simpler and cheaper in construction and operates at significantly lower pressure compared to an LC pump. The aspiration pump can typically be a syringe pump but other types of pumps may be used depending on precision and speed requirements.

The term "buffer sample loop" can refer to a conduit, typically a tubing having a predefined length and diameter and hence a predefined inner volume, having only one end connected to a port such as, for example, the aspiration/dispensing pump port of the same LC switching valve to which valve the analytical sample loop can also be connected with both ends. The other end of the buffer sample loop can be fluidically connected to the aspiration pump.

The term "analytical sample loop" can refer to a conduit, typically a tubing having a predefined length and diameter and hence a predefined inner volume, having two ends connected to two respective ports of the same LC switching valve such as, for example, to the analytical sample loop input port and the analytical sample loop output port respectively, for receiving at least part of the sample aspirated into the buffer sample loop when the analytical sample loop input port is connected to the aspiration/dispensing pump port. The predefined inner volume of the analytical sample loop can determine the maximum volume of sample that can be injected into an LC column. However, the volume of sample that can be injected can depend on how much sample volume is received into the analytical sample loop from the buffer sample loop, which can be a fraction of the total inner volume of the analytical sample loop, and can therefore be variable depending on the specific LC conditions from time to time. Thus, flexibility in adapting the injection conditions, by adapting the volume of analytical sample being injected, can be achieved. Also, since sample loading into the buffer sample loop can occur independently from sample injection into the LC column from the analytical sample loop, for example, at least in part in parallel, further time saving and therefore higher throughput can be achieved.

According to an embodiment, the analytical sample loop can have an inner diameter of less than 0.5 mm or even less than 0.3 mm and a total inner volume of about 20 μl or less such as, for example, about 10 μl.

According to an embodiment, the buffer sample loop can have an inner volume greater than the inner volume of the analytical sample loop and/or a larger inner diameter than the inner diameter of the analytical sample loop. A larger inner diameter may have an advantageous effect in terms of flow rate and therefore time saving.

According to an embodiment, the sample injector can further comprise a secondary valve fluidically connecting the aspiration pump with the buffer sample loop. The secondary valve can be a lower pressure valve compared to the LC switching valve.

According to an embodiment, the sample injector can further comprise a wash pump connected to the secondary valve for pumping wash fluid through at least part of the sample injector contacted by a sample. The wash pump may be similar in construction and design to the aspiration pump. It may be however configured to pump larger volumes and/or to pump at higher flow-rate and possibly have lower requirements in terms of precision. A wash fluid may be any fluid, including water, solvent or a liquid solution containing one or more additives such as, for example, a detergent or reactive substance, for washing parts contacted by a sample between consecutive sample injections in order to minimize carryover between different samples.

According to an embodiment, the sample injector can further comprise a metering pump connected to the secondary valve for dispensing a metered volume of sample out of the sample aspirated into the buffer sample loop by the aspiration pump into the analytical sample loop. The metering pump may be similar in construction and design to the aspiration pump. It may be however configured to be more precise than the aspiration pump such as, for example, adapted to pump smaller volumes, in order to more precisely meter a volume of sample out of the buffer sample loop into the buffer sample loop, whereas the aspiration pump can be faster than the metering pump in order to load a sufficiently large and not necessarily precise volume of sample into buffer sample loop as quick as possible.

According to an embodiment, the aspiration pump can also be a metering pump for dispensing a metered volume of sample out of the sample aspirated into the buffer sample loop into the analytical sample loop. In this case, the aspiration/metering pump may be optimized for best compromise between speed and precision.

A method of injecting a sample for liquid chromatography via an LC switching valve comprising a sample input port, an aspiration/dispensing pump port, an analytical sample loop input port and an analytical sample loop output port, and an LC pump port and an LC column port is herein also disclosed. The method can comprise aspirating a volume of sample into a buffer sample loop by an aspiration pump fluidically connected to the aspiration/dispensing pump port via the buffer sample loop by connecting the aspiration/dispensing pump port to the sample input port. The method can further comprise receiving into an analytical sample loop connected to the LC switching valve between the analytical sample loop input port and the analytical sample loop output port, at least part of the sample aspirated into the buffer sample loop by connecting the analytical sample loop input port to the aspiration/dispensing pump port. The method can further comprise injecting the sample received into the analytical sample loop into an LC column fluidically connected to the LC column port by an LC pump fluidically connected to the LC pump port, by connecting the LC pump port to the analytical sample loop output port and the LC column port to the analytical sample loop input port.

According to an embodiment, the method can further comprise aspirating a volume of sample into the buffer sample loop greater than a volume of analytical sample to be received into the analytical sample loop.

According to an embodiment, the method can further comprise dispensing a metered volume of analytical sample smaller than the volume of sample aspirated into the buffer sample loop into the analytical sample loop by either the aspiration pump or by a metering pump fluidically connected to the buffer sample loop via secondary valve.

According to an embodiment, the method can further comprise pumping wash fluid through at least part of the sample injector contacted by a sample by a wash pump via the buffer sample loop.

According to an embodiment, the method can further comprise wasting excess of sample and/or wash fluid through the sample input port by connecting the sample input port to the aspiration/dispensing pump port or to the analytical sample loop output port.

A liquid chromatography system comprising a sample injector according to any of the previous embodiments is herein also disclosed.

Also, a clinical diagnostic system comprising the liquid chromatography system and a mass spectrometer coupled to the liquid chromatography system is herein disclosed.

A "liquid chromatography system" can be an analytical apparatus or module or a unit in an analytical apparatus for carrying out liquid chromatography and comprising a sample injector according to any of the disclosed embodiments. The liquid chromatography system may be embodied as a single channel or as a multi-channel system comprising a plurality of LC columns arranged in parallel and/or in series.

A "clinical diagnostics system" can be a laboratory automated apparatus for the analysis of samples for in-vitro diagnostics. The clinical diagnostics system may have different configurations according to the need and/or according to the desired laboratory workflow. Additional configurations may be obtained by coupling a plurality of apparatuses and/or modules together. A "module" can be a work cell, typically smaller in size than the entire clinical diagnostics system, which can have a dedicated function. This function can be analytical but can be also pre-analytical or post analytical or it can be an auxiliary function to any of the pre-analytical function, analytical function or post-analytical function. In one embodiment, a module can be configured to cooperate with one or more other modules for carrying out dedicated tasks of a sample processing workflow such as, for example, by performing one or more pre-analytical and/or analytical and/or post-analytical steps. Thus the clinical diagnostic system may comprise one analytical apparatus or a combination of any of such analytical apparatuses with respective workflows, where pre-analytical and/or post analytical modules may be coupled to individual analytical apparatuses or be shared by a plurality of analytical apparatuses. In alternative pre-analytical and/or post-analytical functions may be performed by units integrated in an analytical apparatus. The clinical diagnostics system can comprise functional units such as liquid handling units for pipetting and/or pumping and/or mixing of samples and/or reagents and/or system fluids, and also functional units for sorting, storing, transporting, identifying, separating, detecting. In one embodiment, the clinical diagnostics system can comprise a liquid chromatography system and a mass spectrometer coupled to the liquid chromatography system, either distinguishable as individual and exchangeable units coupled to each other or at least in part integrated into a common system housing.

More in detail, the clinical diagnostics system may comprise a sample preparation module for the automated preparation of samples, a liquid chromatography system coupled to the sample preparation module via the sample injector, and a mass spectrometer (MS) module coupled to the liquid chromatography system via an LC/MS interface.

According to an embodiment, the liquid chromatography system can be an intermediate analytical module designed to prepare a sample for mass spectrometry and/or to transfer a prepared sample to a mass spectrometer. In one embodiment, typically, during an LC run, the mass spectrometer may be set to scan a specific mass range. LC/MS data can be represented by adding up the ion current in the individual mass scans and plotting that "totaled" ion current as an intensity point against time. The resulting plot can look like an HPLC UV trace with analyte peaks. The liquid chromatography system may otherwise comprise a detector of its own such as a UV detector.

A "mass spectrometer (MS)" can be an analytical apparatus comprising a mass analyzer designed to further separate and/or detect analytes eluted from the liquid chromatography system, based on their mass to charge ratio. According to an embodiment, the mass spectrometer can be a fast scanning mass spectrometer. According to another embodiment, the mass spectrometer can be a tandem mass spectrometer capable of selecting parent molecular ions, generating fragments by collision induced fragmentation and separating the fragments or daughter ions according to their mass to charge (m/z) ratio. According to an embodiment, the mass spectrometer can be a triple quadrupole mass spectrometer, as known in the art. Besides quadrupoles, other types of mass analyzers may be used as well, including time of flight, ion trap or combinations thereof.

The LC/MS interface can comprise an ionization source, for the generation of charged analyte molecules (molecular ions) and transfer of the charged analyte molecules into the gas phase. According to certain embodiments, the ionization source can be an electro-spray-ionization (ESI) source or a heated-electrospray-ionization (HESI) source or an atmospheric-pressure-chemical-ionization (APCI) source or an atmospheric-pressure-photo-ionization (APPI) or an atmospheric-pressure-laser-ionization (APLI) source. The LC/MS interface may comprise however a double ionization source, e.g., both an ESI and an APCI source or a modular exchangeable ionization source.

The clinical diagnostic system may further comprise a controller. The term "controller" as used herein can encompass any physical or virtual processing device such as, for example, a programmable logic controller running a computer-readable program provided with instructions to perform operations in accordance with an operation plan such as, for example, associated with the method of injecting a sample for liquid chromatography via the LC switching valve, including controlling the switching of the LC switching valve and controlling the operation of any one or more of the LC pump, the aspiration pump, the metering pump, the wash pump. The controller may be part of the sample injector or of the liquid chromatography system or be a separate logic entity in communication therewith. In some embodiments, the controller may be integral with a data management unit, may be comprised by a server computer and/or be part of one clinical diagnostic system or even distributed across a plurality of clinical diagnostic systems.

The controller may be also configurable to control the clinical diagnostic system in a way that workflow(s) and workflow step(s) can be conducted by the clinical diagnostic system.

In one embodiment, the controller may communicate and/or cooperate with a scheduler and/or data manager in order to take into account incoming analysis orders and/or received analysis orders and a number of scheduled process operations associated with the execution of the analysis orders in order to decide when and which sample has to be prepared and for each sample when and which preparation step has to be executed. As different types of samples and/or different analytes of interest contained in the same or different types of samples may require different preparation conditions such as, for example, different reagents, or different number of reagents, different volumes, different incubation times, different washing conditions, and the like preparation of different samples may require different sample preparation workflows. The controller may thus be programmed to assign samples to pre-defined sample preparation workflows each comprising a pre-defined sequence of sample preparation steps, including e.g., different steps and/or a different number of steps, and requiring a predefined time for completion such as, for example, from a few minutes to several minutes.

The controller may schedule sample preparation to occur in parallel or in a staggered manner for different samples. By doing so in a logical manner, the controller can schedule the use of functional resources of the sample preparation station in order to increase efficiency while avoiding conflicts and maximizes throughput by preparing samples at a pace at which prepared samples can be loaded by the sample injector and injected into an LC column and/or into the liquid chromatography system. Thus, rather than preparing a batch of samples in advance which, of course, can also be possible, the controller can instruct the sample preparation station to prepare samples as needed or as can be taken from the liquid chromatography system such as, for example, by individual LC channels, while taking into account incoming orders, e.g., priority orders, time of preparation, required use of functional resources, availability of the LC channel for which that sample is intended by the time sample preparation is completed.

FIGS. 1A-E, taken together, schematically show a first embodiment of sample injector 100 for liquid chromatography and the various steps of a respective method of injecting a sample 1 for liquid chromatography, where the presence of fluid being pumped is indicated with thicker bold lines and the direction of flow by the direction of arrows. The sample injector 100 can comprise an LC switching valve 10 comprising a sample input port 11, an aspiration/dispensing pump port 12, an analytical sample loop input port 13 and an analytical sample loop output port 14, and an LC pump port 15 and an LC column port 16. The sample injector 100 can further comprise an aspiration pump 20 fluidically connected to the aspiration/dispensing pump port 12 via a buffer sample loop 30 for aspirating a sample 1 from a sample container 2 into the buffer sample loop 30 when the aspiration/dispensing pump port 12 is connected to the sample input port 11; an analytical sample loop 40 connected to the LC switching valve 10 between the analytical sample loop input port 13 and the analytical sample loop output port 14, for receiving at least part of the sample 1 aspirated into the buffer sample loop 30 when the analytical sample loop input port 13 is connected to the aspiration/dispensing pump port 12; an LC column 50 fluidically connected to the LC column port 16, and an LC pump 60 fluidically connected to the LC pump port 15, for injecting the sample 1 received into the analytical sample loop 40 into the LC column 50 when the LC pump port 15 is fluidically connected to the analytical sample loop output port 14 and the LC column port 16 is fluidically connected to the analytical sample loop input port 13.

The LC switching valve 10 can be, in this embodiment, a six-port valve capable of assuming two switch positions.

Figure 1B:
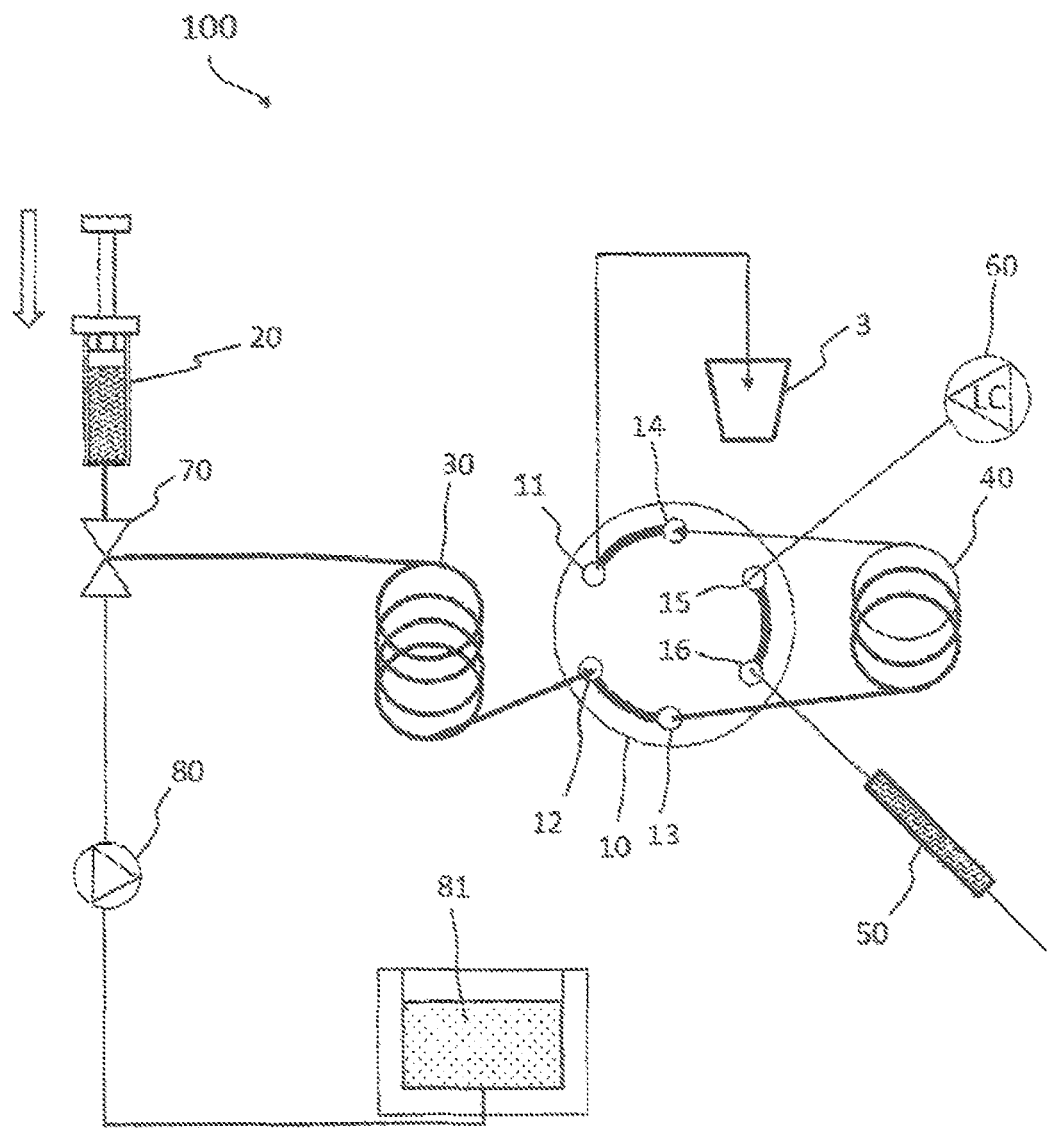
FIG. 1B illustrates schematically the same embodiment of sample injector as in FIG. 1A and another step of the same method of injecting a sample for liquid chromatography according to an embodiment of the present disclosure.
Figure 1C:
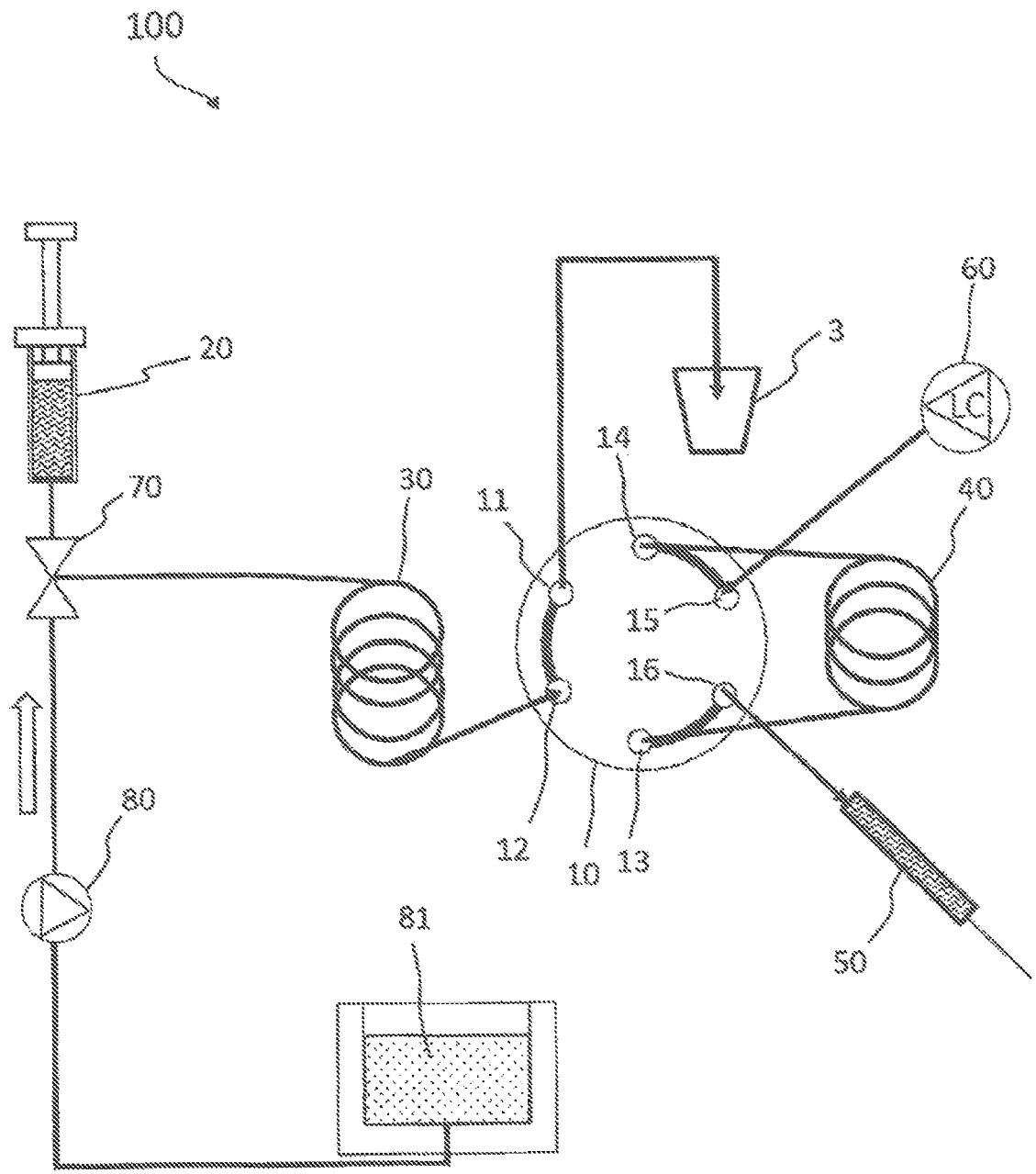
FIG. 1C illustrates schematically the same embodiment of sample injector as in FIGS. 1A-B and another step of the same method of injecting a sample for liquid chromatography according to an embodiment of the present disclosure.

In one embodiment, the sample input port 11 can be used also as a waste port, depending of the method step, for wasting waste liquid from the sample injector 100 into a waste container 3, as shown in FIGS. 1B-C, IE, 2B-C, and 2E.

The aspiration pump 20, in the embodiment of FIGS. 1A-D, can also be a metering pump for dispensing a metered volume of sample 1 out of the sample 1 aspirated into the buffer sample loop 30 into the analytical sample loop 40.

The sample injector 100 can further comprise a secondary valve 70 fluidically connecting the aspiration pump 20 with the buffer sample loop 30.

The sample injector 100 can further comprise a wash pump 80 connected to the secondary valve 70 for pumping wash fluid 81 through at least part of the sample injector 100 contacted by the sample 1.

In one embodiment, FIG. 1A shows the LC switching valve 10 in a first switching position where the aspiration/dispensing pump port 12 can be connected to the sample input port 11, the LC pump port 15 can be fluidically connected to the analytical sample loop output port 14 and the LC column port 16 can be fluidically connected to the analytical sample loop input port 13. FIG. 1A also shows the method step of aspirating a volume of sample 1 into the buffer sample loop 30 by the aspiration pump 20 fluidically connected to the aspiration/dispensing pump port 12 via the buffer sample loop 30, being the aspiration/dispensing pump port 12 connected to the sample input port 11.

FIG. 1B shows the LC switching valve 10 in a second switching status where the analytical sample loop output port 14 can be connected to the sample input port 11 which can act, in this case, as a waste port, the analytical sample loop input port 13 can be connected to the aspiration/dispensing pump port 12 and the LC pump port 15 can also be connected to the LC column port 16. FIG. 1B also shows the method step of receiving into the analytical sample loop 40 connected to the LC switching valve 10 between the analytical sample loop input port 13 and the analytical sample loop output port 14, at least part of the sample 1 aspirated into the buffer sample loop 30, the analytical sample loop input port 13 being connected to the aspiration/dispensing pump port 12. This can be done by action of the same aspiration pump 20 which can also be a metering pump.

The volume of sample that is received into the analytical sample loop 40 from the buffer sample loop 30 can be a fraction of the total inner volume of the analytical sample loop 40 and can therefore be variable depending on the specific LC conditions from time to time. Also, several injections out of the same sample 1 aspirated in the buffer sample loop 30 can be made by sequentially transferring porting of the aspirated sample volume into the analytical sample loop 40. In one embodiment, the method may comprise dispensing a metered volume of analytical sample smaller than the volume of sample aspirated into the buffer sample loop 30 into the analytical sample loop 40.

According to an embodiment, the buffer sample loop 30 can have an inner volume greater than the inner volume of the analytical sample loop 40 and/or a larger inner diameter than the inner diameter of the analytical sample loop 40.

FIG. 1C shows the LC switching valve 10 again in the first switching position like in FIG. 1A and the method step of injecting the sample received into the analytical sample loop 40 into the LC column 50 fluidically connected to the LC column port 16 by the LC pump 60 fluidically connected to the LC pump port 15, the LC pump port 15 being connected to the analytical sample loop output port 14 and the LC column port 16 to the analytical sample loop input port 13. Parallel to sample injection, the method can further comprise pumping wash fluid 81 by the wash pump 80 through the buffer sample loop 30 in order to wash at least part of the sample injector 100 contacted by the sample, thereby washing out and wasting excess or traces of sample into a waste container 3 through the sample input port 11 which, also, in this case, can act as a waste port by connecting the sample input port 11 to the aspiration/dispensing pump port 12.

Figure 1D:
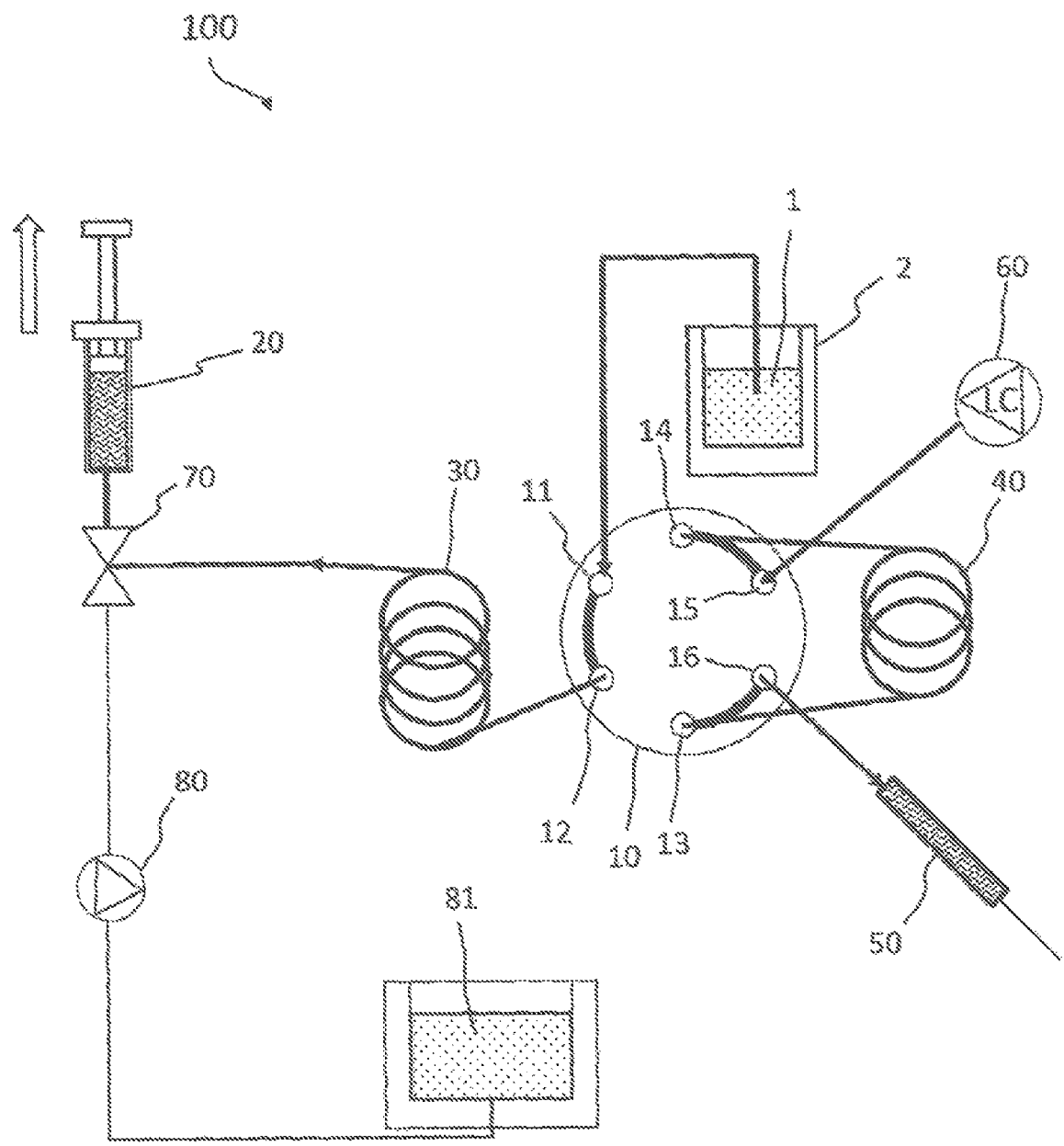
FIG. 1D illustrates schematically the same embodiment of sample injector as in FIGS. 1A-C and another step of the same method of injecting a sample for liquid chromatography according to an embodiment of the present disclosure.

FIG. 1D is the same as FIG. 1A, in which the method step of sample aspiration into the buffer sample loop can be repeated, however while sample injection can also be taking place. In one embodiment, by a fast wash pump 80 and a fast aspiration/metering pump 20 both the washing step as in FIG. 1C and aspiration of a new sample can take place in parallel to injection of a previous sample.

Figure 1E:
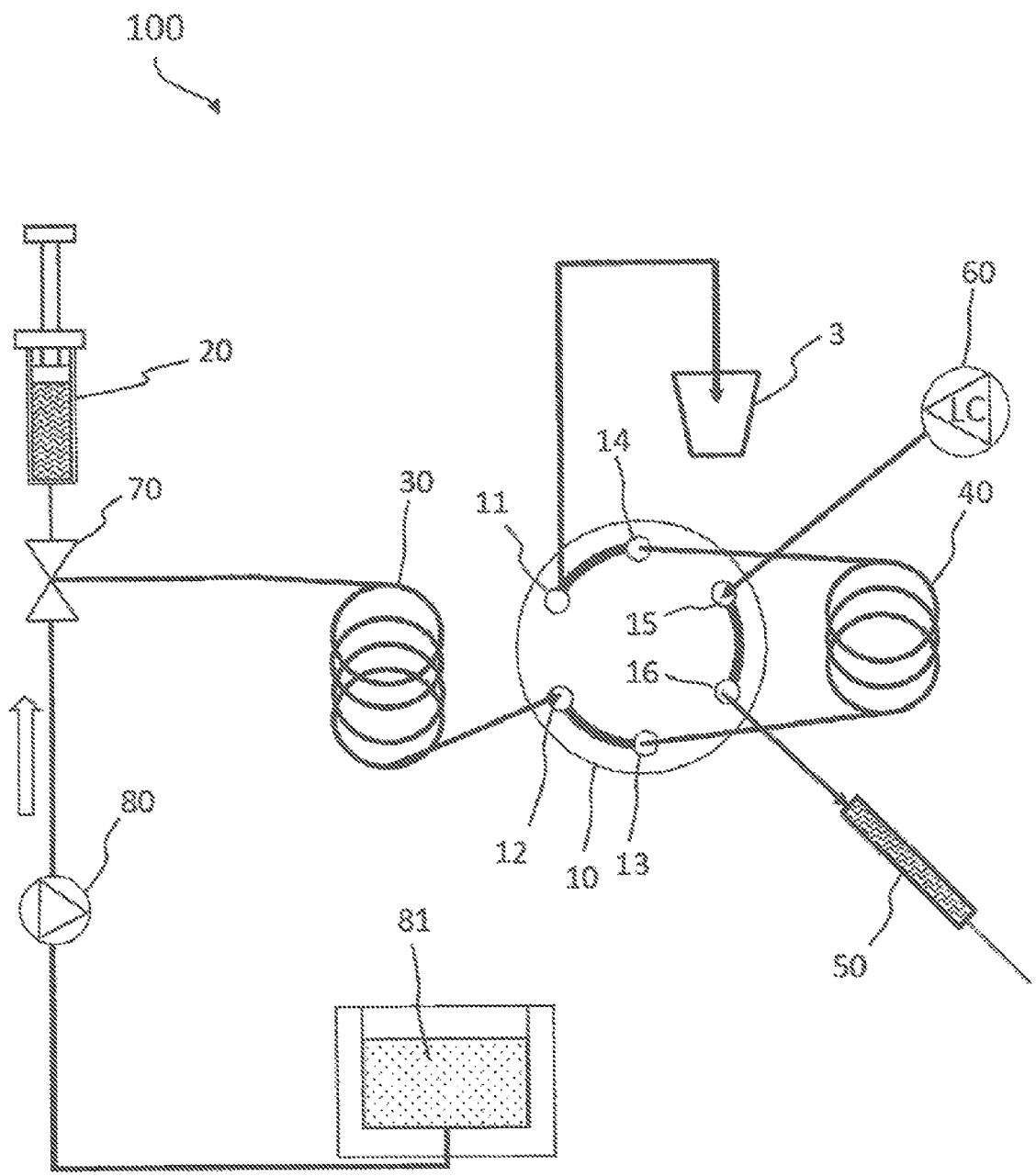
FIG. 1E illustrates schematically the same embodiment of sample injector as in FIG. 1A-D and another step of the same method of injecting a sample for liquid chromatography according to an embodiment of the present disclosure.
Figure 2A:
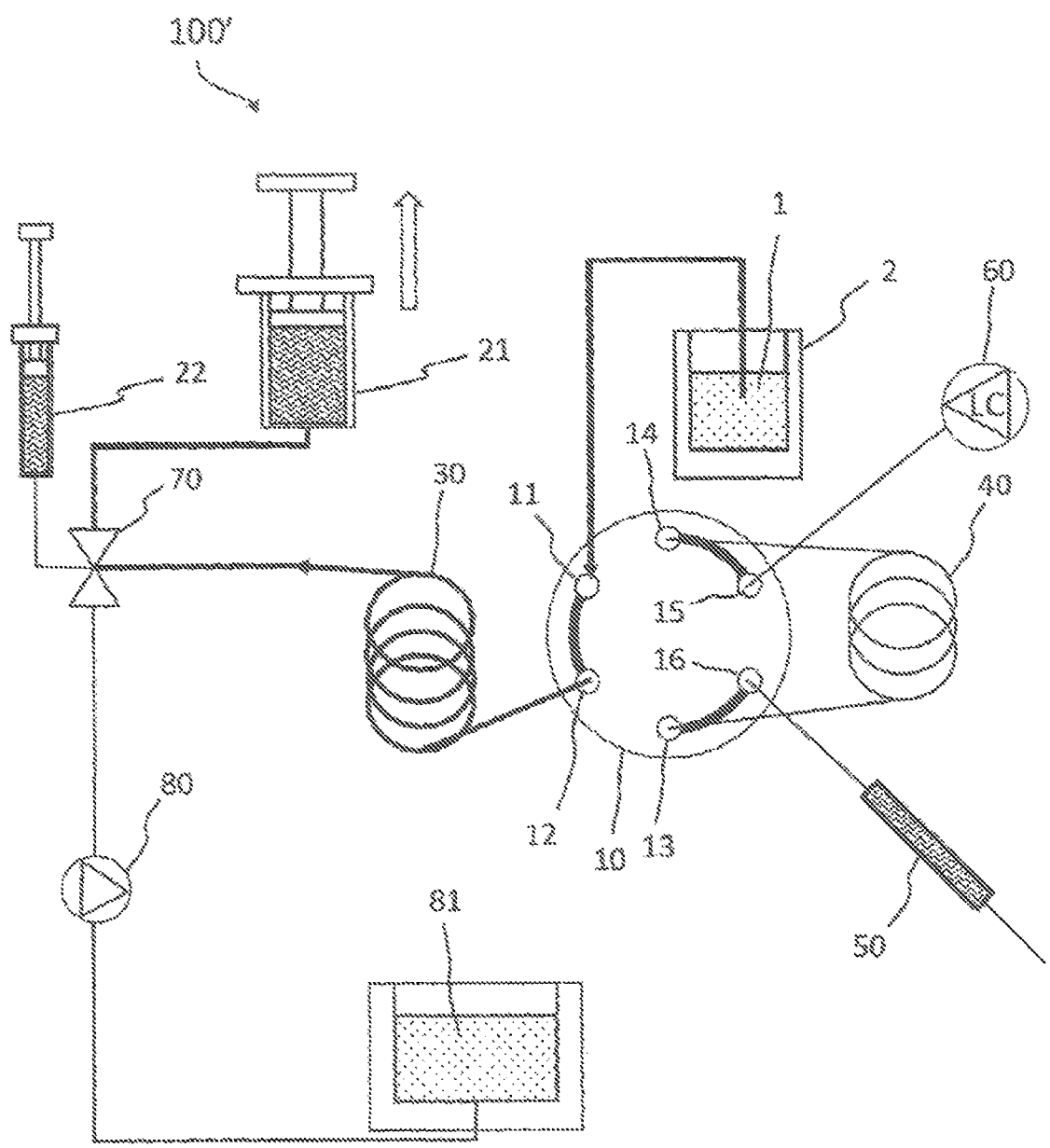
FIG. 2A illustrates schematically a second embodiment of sample injector and a step of a respective method of injecting a sample for liquid chromatography according to an embodiment of the present disclosure.
Figure 2B:
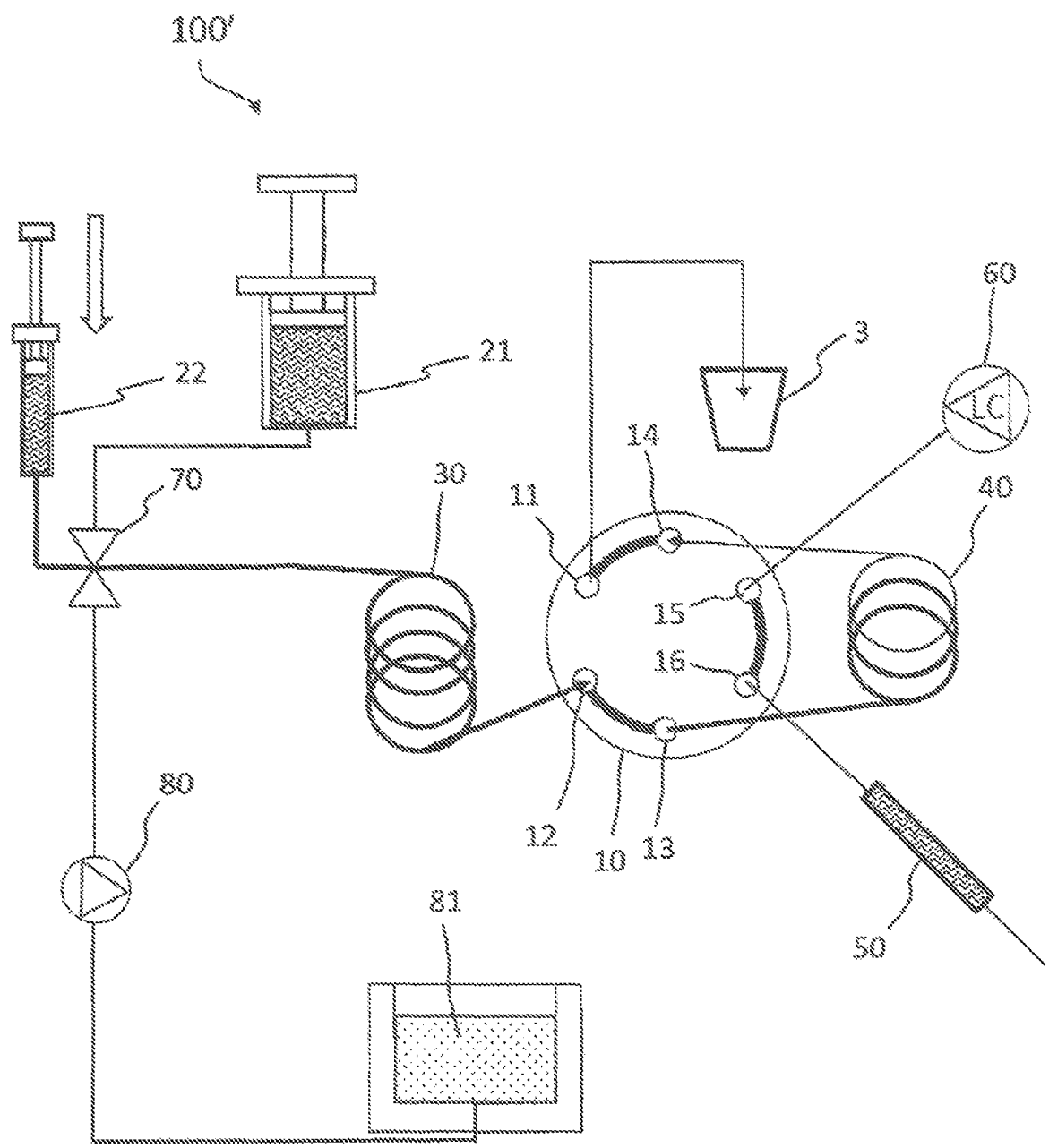
FIG. 2B illustrates schematically the same embodiment of sample injector as in FIG. 2A and another step of the same method of injecting a sample for liquid chromatography according to an embodiment of the present disclosure.
Figure 2C:
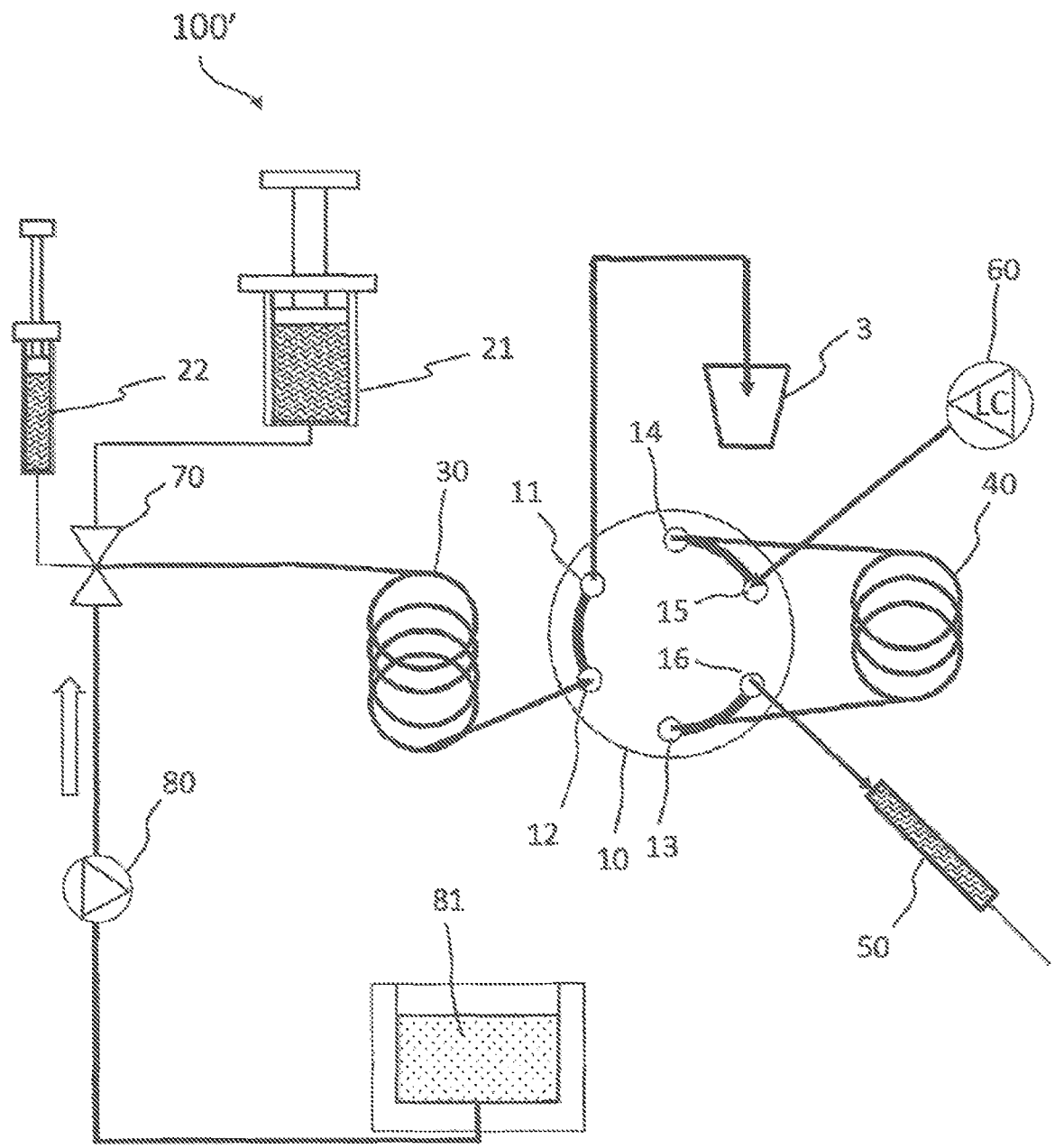
FIG. 2C illustrates schematically the same embodiment of sample injector as in FIG. 2A-B and another step of the same method of injecting a sample for liquid chromatography according to an embodiment of the present disclosure.
Figure 2D:
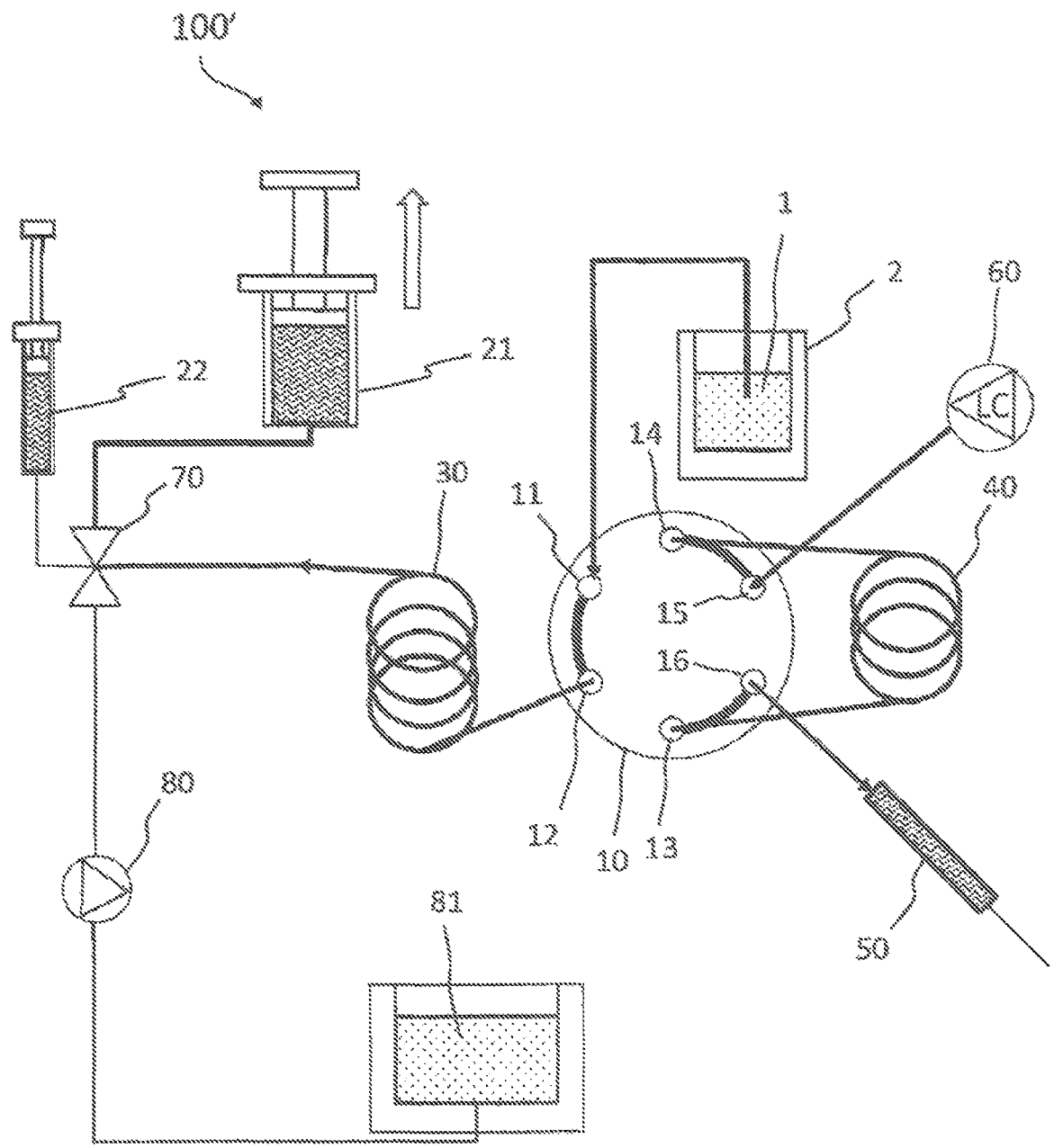
FIG. 2D illustrates schematically the same embodiment of sample injector as in FIG. 2A-C and another step of the same method of injecting a sample for liquid chromatography according to an embodiment of the present disclosure.
Figure 2E:
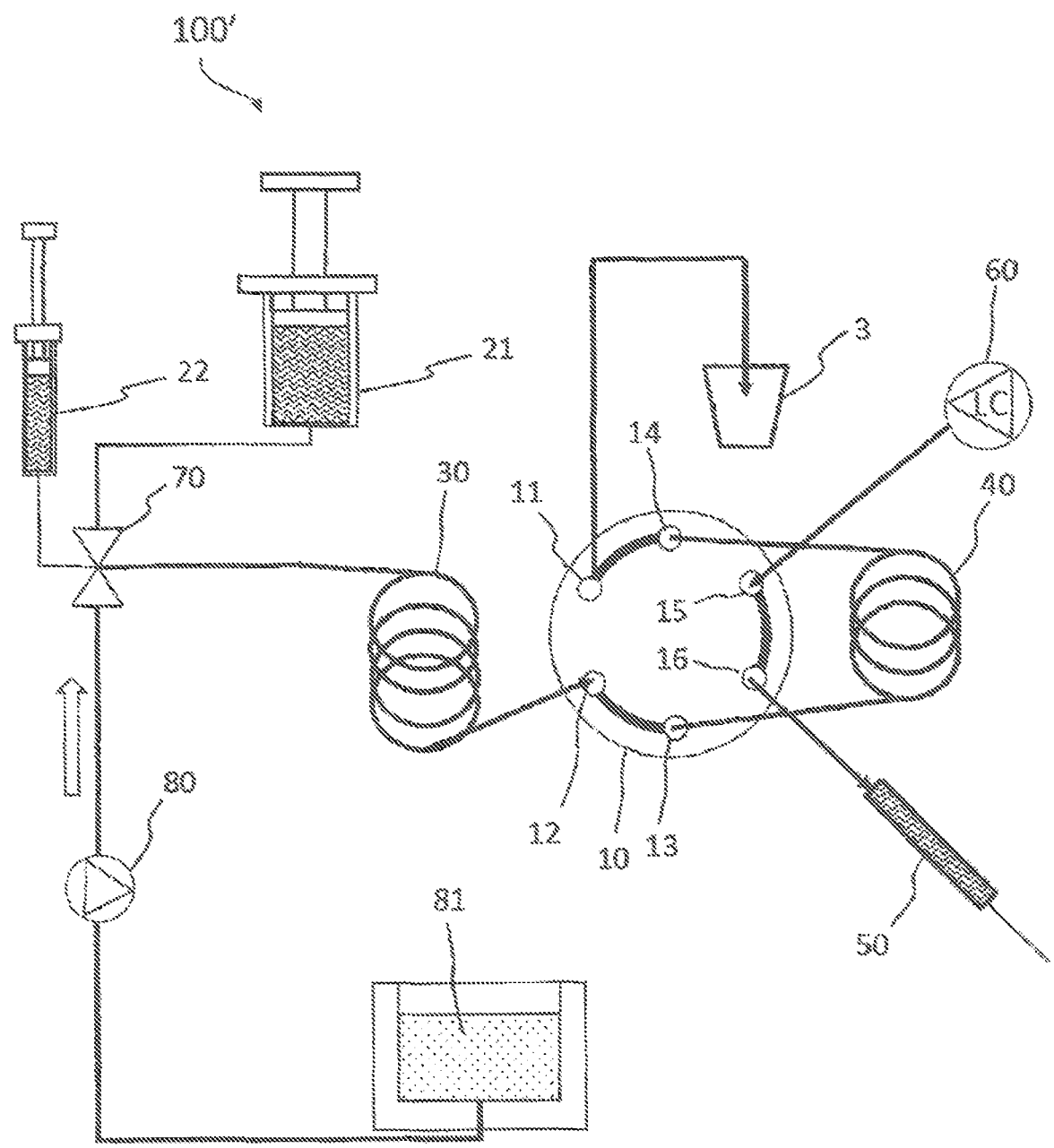
FIG. 2E illustrates schematically the same embodiment of sample injector as in FIG. 2A-D and another step of the same method of injecting a sample for liquid chromatography according to an embodiment of the present disclosure.

FIG. 1E shows the LC switching valve 10 again in the second switch position and the method step of subjecting the sample injected into the LC column 50 to liquid chromatography, being the LC pump port 15 connected to the LC column port 16. At the same time, wash fluid 81 can be pumped by wash pump 80 also through the analytical sample loop 40 before the entire process can be repeated.

FIGS. 2A-E, taken together, schematically show a second embodiment of sample injector 100' for liquid chromatography and the various steps of a respective method of injecting a sample 1 for liquid chromatography where the presence of fluid being pumped is indicated with thicker bold lines and the direction of flow by the direction of arrows. The sample injector 100' can be substantially the same of the sample injector 100 of FIGS. 1A-E, where like features are given like numbers, with the exception that the sample injector 100', instead of a single pump 20 that functions as sample aspiration pump and sample metering pump, can comprise an aspiration pump 21 for aspirating the sample 1 into the buffer sample loop 30 and a separate metering pump 22 connected to the secondary valve 70 for dispensing a metered volume of sample out of the sample aspirated into the buffer sample loop 30 by the aspiration pump 21 into the analytical sample loop 40, wherein the metering pump 22 can be more precise than the aspiration pump 21 and the aspiration pump 21 can be faster than the metering pump 22. For the rest, the same description relative to FIGS. 1A-E applies also to FIGS. 2A-E respectively.

Figure 3:
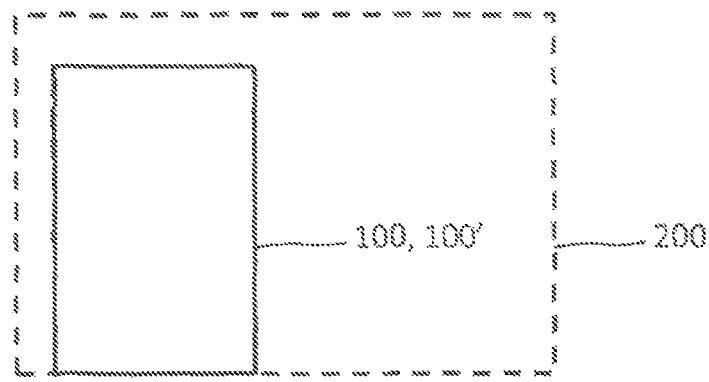
FIG. 3 illustrates schematically a liquid chromatography system comprising a sample injector as in FIG. 1A-2E according to an embodiment of the present disclosure.

FIG. 3 schematically shows a liquid chromatography system 200 comprising a sample injector 100, 100' according to any of the first or second embodiment of FIGS. 1A-2E.

Figure 4:
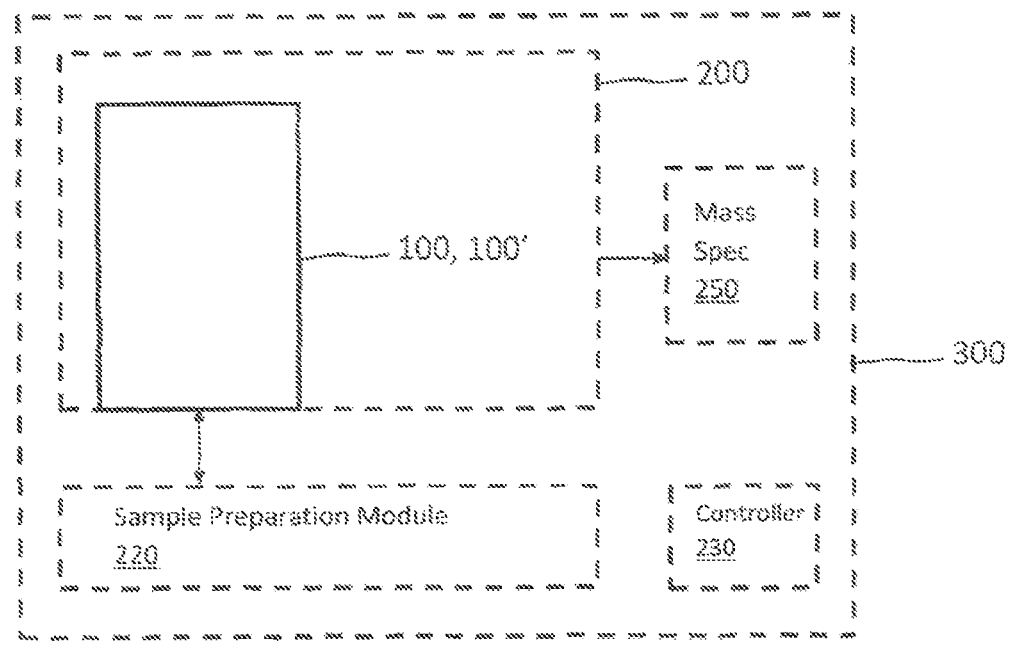
FIG. 4 illustrates schematically a clinical diagnostic system comprising the liquid chromatography system of FIG. 3 according to an embodiment of the present disclosure.

FIG. 4 schematically shows a clinical diagnostic system 300 comprising the liquid chromatography system 200 of FIG. 3 and a mass spectrometer 250 coupled to the liquid chromatography system 200. The clinical diagnostics system 300 can further comprise a sample preparation module 220 for the automated preparation of samples to be injected and coupled to the liquid chromatography system 200 via the sample injector 100, 100'. The clinical diagnostics system 300 can further comprise a controller 230 associated at least with the method of injecting samples for liquid chromatography, including controlling the switching of the LC switching valve and operation of the various pumps.

In the preceding specification, numerous specific details are set forth in order to provide a thorough understanding of the present disclosure. It will be apparent, however, to one having ordinary skill in the art that the specific detail need not be employed to practice the present teaching. In other instances, well-known materials or methods have not been described in detail in order to avoid obscuring the present disclosure.

Reference throughout the preceding specification to "one embodiment", "an embodiment", "one example" or "an example", can mean that a particular feature, structure or characteristic described in connection with the embodiment or example can be included in at least one embodiment. Thus, appearances of the phrases "in one embodiment", "in an embodiment", "one example" or "an example", in various places throughout this specification are not necessarily all referring to the same embodiment or example.

Furthermore, the particular features, structures, or characteristics may be combined in any suitable combinations and/or sub-combinations in one or more embodiments or examples.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. A sample injector configured for liquid chromatography (LC), the sample injector comprising:
    an LC switching valve comprising a sample input port, an aspiration/dispensing pump port, an analytical sample loop input port and an analytical sample loop output port, and an LC pump port and an LC column port;
    an aspiration pump fluidically connected to the aspiration/dispensing pump port via a buffer sample loop configured for aspirating a sample into the buffer sample loop when the aspiration/dispensing pump port is connected to the sample input port;
    an analytical sample loop connected to the LC switching valve between the analytical sample loop input port and the analytical sample loop output port configured for receiving at least part of the sample aspirated into the buffer sample loop when the analytical sample loop input port is connected to the aspiration/dispensing pump port;
    an LC column fluidically connected to the LC column port; and
    an LC pump fluidically connected to the LC pump port configured for injecting the sample received into the analytical sample loop into the LC column when the LC pump port is fluidically connected to the analytical sample loop output port and the LC column port is fluidically connected to the analytical sample loop input port.

2. The sample injector according to claim 1, wherein the sample input port is also a waste port.

3. The sample injector according to claim 1, wherein the analytical sample loop output port is connected to the sample input port when the analytical sample loop input port is connected to the aspiration/dispensing pump port.

4. The sample injector according to claim 1, wherein the buffer sample loop has an inner volume greater than the inner volume of the analytical sample loop and/or a larger inner diameter than the inner diameter of the analytical sample loop.

5. The sample injector according to claim 1, further comprising,
    a secondary valve fluidically connecting the aspiration pump with the buffer sample loop.

6. The sample injector according to claim 5, further comprising,
    a wash pump connected to the secondary valve configured for pumping wash fluid through at least part of the sample injector contacted by a sample.

7. The sample injector according to claim 5, further comprising,
    a metering pump connected to the secondary valve configured for dispensing a metered volume of sample out of the sample aspirated into the buffer sample loop by the aspiration pump into the analytical sample loop, wherein the metering pump is more precise than the aspiration pump and the aspiration pump is faster than the metering pump.

8. The sample injector according to claim 7, wherein the aspiration pump is also a metering pump for dispensing a metered volume of sample out of the sample aspirated into the buffer sample loop into the analytical sample loop.

9. A liquid chromatography system, the liquid chromatography system comprising:
    a sample injector according to claim 1.

10. A clinical diagnostic system, the clinical diagnostic system comprising:
    a liquid chromatography system according to claim 9; and
    a mass spectrometer coupled to the liquid chromatography system.

11. A method of injecting a sample for liquid chromatography (LC) by a sample injector, wherein the sample injector comprises an LC switching valve comprising a sample input port, an aspiration/dispensing pump port, an analytical sample loop input port and an analytical sample loop output port, and an LC pump port and an LC column port, the method comprising:
    aspirating a volume of sample into a buffer sample loop by an aspiration pump fluidically connected to the aspiration/dispensing pump port via the buffer sample loop by connecting the aspiration/dispensing pump port to the sample input port;
    receiving into an analytical sample loop connected to the LC switching valve between the analytical sample loop input port and the analytical sample loop output port, at least part of the sample aspirated into the buffer sample loop by connecting the analytical sample loop input port to the aspiration/dispensing pump port; and
    injecting the sample received into the analytical sample loop into an LC column fluidically connected to the LC column port by an LC pump fluidically connected to the LC pump port, by connecting the LC pump port to the analytical sample loop output port and the LC column port to the analytical sample loop input port.

12. The method according to claim 11, further comprising,
    aspirating a volume of sample into the buffer sample loop greater than a volume of analytical sample to be received into the analytical sample loop.

13. The method according to claim 12, further comprising,
    dispensing a metered volume of analytical sample smaller than the volume of sample aspirated into the buffer sample loop into the analytical sample loop by either the aspiration pump or by a metering pump fluidically connected to the buffer sample loop via a secondary valve.

14. The method according to claim 11, further comprising,
    pumping wash fluid through at least part of the sample injector contacted by a sample by a wash pump via the buffer sample loop.

15. The method according to claim 11, further comprising,
    wasting excess of sample and/or wash fluid through the sample input port by connecting the sample input port to the aspiration/dispensing pump port or to the analytical sample loop output port.

* * * * *